March 30, 1937.   H. L. BERNARDE   2,075,083
ELECTRONIC CONTROL SYSTEM
Filed March 11, 1933   2 Sheets-Sheet 1

WITNESSES:
E. A. McClosky
F. J. Hicks

INVENTOR
Henry L. Bernarde.
BY
ATTORNEY

March 30, 1937.  H. L. BERNARDE  2,075,083
ELECTRONIC CONTROL SYSTEM
Filed March 11, 1933　　2 Sheets-Sheet 2
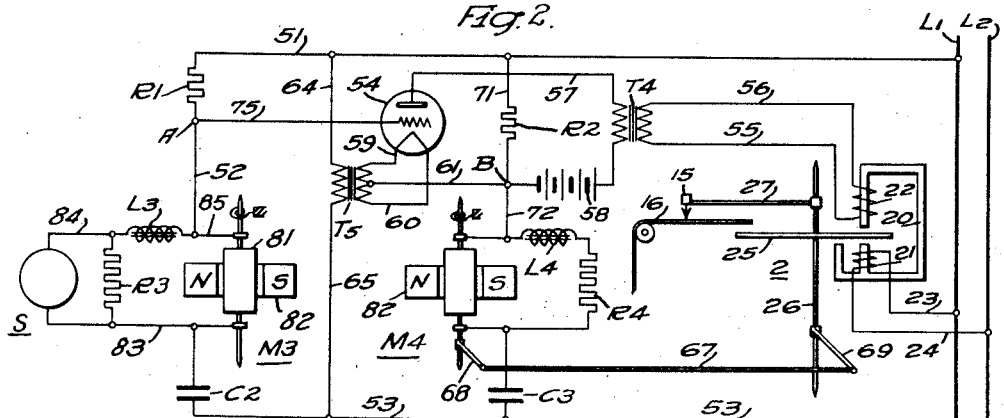
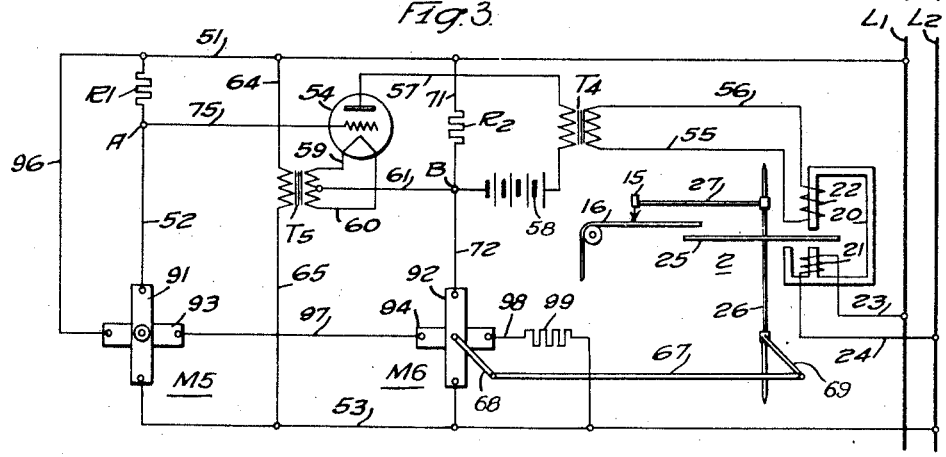
WITNESSES:
INVENTOR
Henry L. Bernarde.
BY
ATTORNEY Patented Mar. 30, 1937

2,075,083

UNITED STATES PATENT OFFICE 2,075,083

ELECTRONIC CONTROL SYSTEM

Henry L. Bernarde, Kearny, N. J., assignor to Westinghouse Electric & Manufacturing Company, East Pittsburgh, Pa., a corporation of Pennsylvania Application March 11, 1933, Serial No. 660,356

9 Claims. (Cl. 177—351)

My invention relates to electronic control systems and more specifically to systems wherein a delicate measuring instrument, such as a galvanometer, is arranged to operate a comparatively heavy indicating or recording instrument, or a control device such as a valve, switch, or rheostat.

In previous systems of this nature it has been necessary to use a Kelvin balance or other balancing system involving the use of numerous mechanically moving parts and electrical contacts, thereby introducing various complications and errors. Other difficulties experienced with previous systems are slow operation, mechanical friction and the tendency to overrun and hunt.

It is accordingly an object of my invention to provide an accurate recording system which is quick in its action and does not overrun or hunt, and which may be applied to the most sensitive mechanism.

A further object of my invention is to provide a recording system which is small, cheap and simple, and which is not subject to inaccuracies due to mechanical load and friction.

Another object of my invention is to provide an electronic system wherein a feeble alternating current potential derived by the movement of a delicate instrument, such as a galvanometer, is amplified sufficiently to control relatively heavy apparatus.

It is also an object of my invention to provide a self-balancing electronic recording system which utilizes sensitive vacuum tubes, which is not rendered inaccurate by variation of the tube characteristics and is self-calibrating.

A further object of my invention is to improve and simplify various electronic systems disclosed in my copending application entitled "Electrical measuring and regulating systems", which was filed July 1, 1932, and to which Serial Number 620,387 has been assigned.

In accordance with one form of my invention, the self-inductance of the moving coils of an electrical measuring instrument are utilized in a balanced bridge circuit to derive from an original alternating current potential a controlling potential which actuates the controlled element.

The invention itself, however, both as to its organization and its method of operation, together with additional objects and advantages thereof, will best be understood from the following description of specific embodiments, when read in conjunction with the accompanying drawings, in which:

Fig. 2 is a diagrammatic view representing the application of my system for control by direct current measuring instruments, and Fig. 3 is a diagrammatic view of a recording wattmeter scheme utilizing a mutual induction bridge arrangement.

Figure 1:
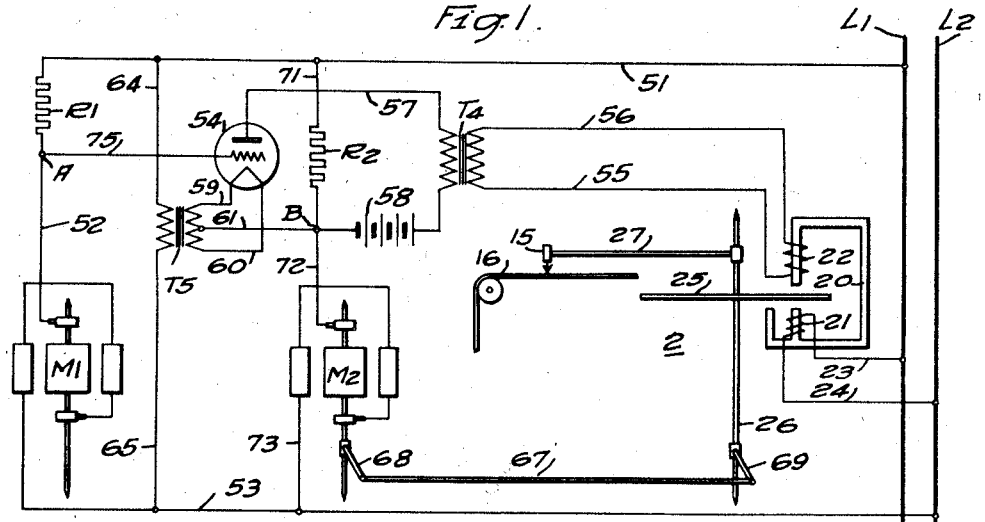
Figure 1 is a diagrammatic view representing an embodiment of my electronic system for controlling a device such as a graphic recording meter.

Referring more specifically to the drawings, in Fig. 1, I have shown an embodiment of the invention wherein a recording device 2 is controlled by a basic controlling element M1 which may be an electrical instrument such as a voltmeter or wattmeter of the dynamometer type or it may be any instrument which is so constructed that an electrical characteristic, such as self-inductance, mutual inductance or capacitance, varies as it turns to different indicating positions.

The controlled device 2 may be a recorder motor of the induction disk type for driving the pen 15 of the graphic meter across a record sheet 16 which may be moved under the pen in any well known manner. Such a motor comprises a two-phase field structure 20 having two windings 21 and 22. One of the windings 21 is connected by suitable conductors 23 and 24 to main line conductors L1 and L2 of a commercial alternating current line from which it is continuously energized.

The other winding 22 of the motor when energized through the tube 54, in a manner to be subsequently described, sets up a field which in conjunction with that set up by the normally energized winding 21 creates a torque in an adjacent eddy current disk 25 which is thereby caused to rotate in a manner which will be readily understood. The disk 25 is secured to a shaft 26 to which is also secured a laterally projecting arm 27 which supports the recording pen 15.

As specifically disclosed, the basic element M1 is represented as a voltmeter connected across the main line alternating current conductors L1, L2 by a circuit comprising conductors L1, 51, resistor R1, conductor 52, instrument M1 and conductor 53 to line conductor L2.

The winding 22 is connected by conductors 55 and 56 to the secondary winding of a coupling transformer T4 having its primary winding connected into the plate circuit 57 of the tube, which latter circuit is energized by any suitable source of direct current represented as a battery 58. The filament of the tube is supplied with heating current by connection through conductors 59, 60 to the secondary winding of a suitable transformer T5 having a center tap for connection with the plate circuit return conductor 61 from the negative terminal of the plate battery 58. To energize the primary winding of the filament transformer T5, it is connected by conductors 64 and 65 across the respective conductors 51 and 53 which, as previously traced, are connected across the main line conductors L1 and L2.

In order to control the tube 54 in accordance with the movements of the instrument M1, a balanced bridge circuit is created by providing a second instrument M2 identical with the first instrument M1 except that its indicating pointer may be omitted, and its movements are restrained, or retarded, by a suitable mechanical connection 67 with the shaft 26 of the recorder motor. The mechanical connecting means may comprise a light connecting link 67 pivotally connected to the ends of laterally extending arms 68 and 69 provided on the shaft of the meter M2 and the recorder motor 2.

The bridge circuit is created by connecting this second, or follow up instrument M2, across conductors 51 and 53 by a circuit which may be traced through conductor 71, resistor R2, conductor 72, instrument M2 and conductor 73. The resistors R1 and R2 are equal and have a resistance of about 1000 ohms but this value is not essential and it may be selected in accordance with the characteristics of the instruments M1 and M2 associated therewith.

The bridge comprises the equal resistors R1 and R2 and the identical instruments M1 and M2 which constitute the four legs thereof and it is energized by alternating current from line conductor L1 through conductors 51 connected between the two resistors and from line conductor L2 connected between the two instruments by the conductor 53.

The bridge is balanced when the instruments M1 and M2 occupy identical angular positions. The conductors 52 and 72, connected between the resistors and the instruments, are the equal potential points in the bridge.

In operation, the amplifier tube 54 is controlled in accordance with the balanced or unbalanced condition of the bridge since its grid is connected by a conductor 75 to a point A on the conductor 52 and its plate-filament return conductor 61 is connected to a point B on the other equipotential conductor 72. When the bridge is balanced, the points A and B are at equal potentials, the potential of the grid of the tube remains constant and consequently the plate current of the tube also remains uniform. Under this condition, the coupling transformer T4 does not supply impulses of current to the winding 22 of the two-phase recorder motor 2 and the latter is not actuated.

When the voltage of the line L1, L2 varies, the movement of the instrument M1 will be rotated to a different position thereby varying its self-induction and unbalancing the bridge. That the bridge will be thus unbalanced is apparent when it is considered that the other identical instrument movement M2 is not free to turn being restrained by link 67 connecting it to the recorder motor.

The bridge being now unbalanced an alternating current potential exists across points A and B. Since the input of the amplifier tube is connected across these points, the alternating current potential will be impressed on the amplifier and will cause corresponding current fluctuations in the plate current of the tube. Corresponding impulses are impressed on the winding 22 of the two-phase recorder motor 2 which in conjunction with the other winding 21, energized directly from the line, sets up a torque in the disk 25 causing the latter to rotate and drive the pen 15 across the record sheet 16.

It will be understood that the phase relation of the alternating current potential between points A and B on the bridge relative to the alternating current line will depend upon the direction of the rotation of instrument M1 which unbalanced the bridge. Hence, if the instrument M1 moved in such a direction as to decrease its self-induction, the phase relation of the alternating current line potential and the derived alternating current potential across points A, B will be opposite to that caused when the bridge is unbalanced by increasing the self-induction of the controlling instrument M1. Consequently, the phase of the exciting current in the winding 22 of the two-phase recorder motor and the direction of the motor rotation also depends upon the direction of rotation of the controlling instrument when it unbalances the bridge.

Furthermore, the amplitude of the derived potentials across points A, B depends upon the amount the bridge is unbalanced. Hence, the degree of energization of the winding 22 of the recorder motor also depends upon the degree of unbalance of the bridge and the motor is driven rapidly or slowly depending upon the amount of rotation of the basic controlling instrument M1.

As the recorder motor 2 operates, in one direction or the other, it turns the identical follow up instrument M2, through the mechanical connector 67, in such a direction that it approaches a position which is identical with the new position taken up by the controlling instrument M1. As this position is approached, the balance of the bridge is gradually restored thereby diminishing the derived potentials across points A, B and gradually bringing the motor to rest without hunting when the proper position is attained.

It is also within the scope of my invention to control the system from an electrostatic voltmeter. In such an application, the basic element M1 and the follow up element M2 are identical electrostatic voltmeters and the circuit is a capacity bridge. It will be understood that, if desired, the bridge may be energized by higher frequencies, instead of commercial frequencies.

In accordance with another embodiment of my invention recorders or other devices may be controlled from direct current instruments by coupling the same into a bridge circuit through suitable condensers and providing choke coils to keep the alternating current bridge potentials out of the direct current service connections. In such an embodiment of my invention, as shown in Fig. 2, the controlling or basic element M3 may be a direct current instrument having a moving coil 81, of the type known as a self-supporting bobbin, rotatably mounted in the uniform field between the poles of a permanent magnet 82. The coil of the instrument M3 is connected through an inductance coil L3 to any direct current source S which is to be regulated or recorded. This connection extends from one terminal of coil 81 by way of a conductor 83 to one terminal of the direct current source S, thence from the other terminal by way of a conductor 84 to one side of the inductance coil and from the other side of the coil by a conductor 85 to the other terminal of the instrument coil 81.

One terminal of the instrument coil 81 is connected to conductor 52 of the alternating current bridge system which is similar to that fully described above, with reference to Fig. 3. The other terminal of the instrument coil 81 is coupled through a condenser C2 to a conductor 53 which extends to one side of a suitable alternating current source L2. A resistor R3 is connected in shunt with the instrument coil by connecting it across the conductors.

The blocking condenser C2 blocks out and prevents any direct current from entering the bridge circuit. It should offer an impedance to the bridge alternating current which is a small fraction, preferably about one tenth, of the impedance of the coil of instrument M3.

The inductance coil L1 in series with the direct current circuit should offer an impedance to the alternating current which is several times greater than that of the instrument coil preferably about ten times. It serves to keep the alternating current bridge current out of the direct current circuit and prevents the short circuiting effect of the resistor R3 and the external circuit across the instrument coil 81. The resistance of resistor R3 should be suitable to give sufficient damping to the moving coil of the instrument M3 to prevent overshooting and oscillation of the pointer.

Another direct current instrument M4 which is exactly the same as the first instrument M3 is connected into the other leg of the alternating current bridge by connecting one terminal of its moving coil directly to the bridge conductor 72. The other terminal of its moving coil is coupled through a condenser C3 to the conductor 53 and thence to one side of the alternating current source L2 which energizes the bridge.

In order that the coil of the second instrument M4 will interpose exactly the same characteristics into the second leg of the bridge it is shunted by a resistor R4 in series with an inductance coil L4 having the same impedance characteristics as the respective resistor R3 and inductance coil L3 which are associated with the first instrument. The bridge resistors R1 and R2 correspond to the resistors similarly designated in Fig. 1. Their resistances are equal and preferably of a value which is similar to the impedance of the movable instrument coils.

The device 2 which is to be controlled may be a two-phase device similar to that previously described, and it is connected to the movable coil of the second instrument M4 by any suitable connecting link 67.

When the moving coils of the two direct current instruments M3 and M4 are at the same angular position their self induction is the same, and the alternating current bridge is balanced, there is zero potential between the points A, B. When the coil of the controlling instrument M3 changes its position, and hence its self induction, the bridge is unbalanced and an alternating current potential occurs across points A, B. This potential is amplified and operates the motor 2 in a corresponding direction, as set forth above with reference to the system shown in Fig. 1. The motor rotates and moves the pen and the coil of the second instrument M4 until its position is the same as the coil of the first instrument M3.

As this position is approached the alternating current voltage across points A, B gradually diminishes and the motor comes to a smooth stop without overshooting or hunting. The theory of operation of this embodiment of my invention is similar to that more fully set forth above with reference to the system shown in Fig. 1, and it will therefore not be repeated in detail.

For a recording wattmeter scheme the mutual induction bridge arrangement, shown in Fig. 3, is especially convenient. In this system the two identical instruments M5 and M6, are wattmeters having their potential coils 91 and 92 connected into the respective legs of the alternating current bridge. The respective current coils 93 and 94 of the wattmeters are connected in series with the load across the alternating current line by a circuit extending from conductor 51, through conductor 96, coil 93, conductor 97, coil 94, conductor 98, thence through the load 99 to conductor 53. The movable coil 92 of the second wattmeter M6 is mechanically connected by any suitable member 67 to the operated device to rebalance the bridge by moving it to the various positions assumed by the coil 93 of the first instrument M5. As the movable coil 91 of the controlling wattmeter M5 moves to various positions the mutual inductance between the two coils 91 and 93 varies, thereby unbalancing the bridge. The two-phase motor 2 is then operated at a speed and direction which depends upon the degree and direction of unbalancing. The motor turns the second instrument and rebalances the bridge when its movement is proportional to that of the controlling instrument M5.

It will be seen that I have provided an electronic controlling system which is anti-hunting, simple, accurate and self-calibrating and which is especially advantageous in the actuation of recording meters by delicate measuring instruments.

Although I have shown and described certain specific embodiments of my invention, in compliance with the statutes, I am fully aware that many modifications thereof are possible. My invention, therefore, is not to be restricted except as necessitated by the prior art and the scope of the appended claims.

I claim as my invention:

1. In combination, a primary electro-responsive device having a movable element directly responsive to an electrical condition, said device being of a type which effects variations of an impedance characteristic upon movement of said element, a member to be actuated in accordance with the actuated position of said element, and means responsive to the variable impedance characteristic of said device for actuating said member accordingly.

2. In combination, a primary electro-responsive device having a movable element directly responsive to an electrical condition, said device being of a type which effects variations of an impedance characteristic upon movement of said element, a member to be moved in accordance with the actuated position of said element, motive means for moving said member comprising two windings, means for energizing one of said windings from an original alternating potential, means including said electro-responsive device for deriving from said original potential a derived potential which varies in phase and amplitude according to the position of said element, means controlled by said derived potential for energizing the second one of said windings, and means for reducing said derived potential to zero when said member has been moved a proportional amount.

3. In combination, a pair of electrical measuring instruments each having a movable element normally responsive to an electrical condition, each of said instruments being of a type which effects variations of an impedance characteristic upon movement of the corresponding element, a device to be moved in accordance with the actuated position of one of said elements, means for mechanically connecting the other of said elements to said device whereby its movements are restrained accordingly, and a bridge circuit including said instruments in different legs thereof.

4. In combination, a pair of alternating current electrical measuring instruments each having a movable element normally responsive to an alternating electrical condition, each of said instruments being of a type which effects variations of an impedance characteristic upon movement of the corresponding element, a two-phase device to be moved in accordance with the actuated position of one of said elements, two windings associated with said device, means for energizing one of said windings from an original alternating potential, potential deriving means comprising a normally balanced bridge including said instruments in different legs thereof for deriving a potential from said original potential which will vary in phase and amplitude in accordance with any position difference between said elements, means for energizing the second one of said windings in accordance with said derived potentials, and means for mechanically connecting the second one of said elements to said device whereby its movements are restrained accordingly.

5. In combination, an electrical instrument having a movable element directly responsive to an electrical condition, said instrument being of a type which effects variations of an impedance characteristic upon movement of said element, a member to be actuated in accordance with the actuated position of said element, and means comprising an automatic balancing alternating current bridge for energizing said member in accordance with the position of said element.

6. In combination, an electrical instrument having a first movable element directly responsive to an electrical condition, said instrument being of a type which effects variations of an impedance characteristic upon movement of said element, a member to be moved in accordance with the actuated position of said element, a second instrument similar to said first instrument, said second instrument having a second movable element, means for energizing said member in accordance with the actuated position of said first movable element comprising a bridge circuit including said instruments, and means for mechanically connecting said second movable element to said member whereby it will be moved to automatically rebalance the bridge after a movement of said first instrument has unbalanced it and moved said member.

7. In combination, a direct current electrical instrument having a first movable element directly responsive to an electrical condition, said instrument being of a type which effects variations of an impedance characteristic upon movement of said element, a source of direct current, means for connecting said direct current source to said instrument including a choke coil, a member to be actuated in accordance with the actuated position of said first movable element, a second instrument similar to said first instrument, said second instrument having a second movable element, means for energizing said member in accordance with the movements of said first movable element comprising a bridge circuit, means including blocking condensers for coupling said instruments in separate legs of the bridge, a source of alternating current for energizing the bridge circuit, and means for mechanically connecting said second movable element to said member whereby it will be moved to automatically rebalance the bridge after a movement of said first movable element has unbalanced it and moved said member.

8. In combination, a wattmeter comprising a current coil and a potential coil mounted in relatively movable relation, said wattmeter being of a type which effects variations of an impedance condition of said potential coil upon relative movement of said potential and current coils, a member to be actuated in accordance with the actuated position of said wattmeter, a second wattmeter similar to said first wattmeter, means for energizing said member in accordance with the actuated position of said first wattmeter comprising a bridge circuit including the potential coils of said wattmeters in different respective legs thereof, a source of alternating current for energizing said bridge circuit, means for connecting the current coils of both of said wattmeters in series with the load to be measured, and means for mechanically connecting the movable coil of said second wattmeter to said member whereby it will be moved to automatically rebalance the bridge after a movement of said first wattmeter has unbalanced it and moved said member.

9. In combination a two-phase device to be actuated in accordance with a variable condition, said device having a pair of windings, an alternating current source, means for energizing one winding of said device directly from said alternating current source, means energized from said alternating current source for energizing the second winding of said device in accordance with said variable condition comprising a bridge circuit having in one leg thereof a primary electrical measuring instrument having relatively movable parts, said instrument being of a type which effects variations of an impedance characteristic upon relative movement of said parts.

HENRY L. BERNARDE.